(12) United States Patent
Matsui

(10) Patent No.: US 12,248,719 B2
(45) Date of Patent: Mar. 11, 2025

(54) STORAGE MEDIUM ENABLING EASY GRASPING OF CAPABILITIES OF PRINTER BY ICONS, AND CONTROL METHOD

(71) Applicant: CANON KABUSHIKI KAISHA, Tokyo (JP)

(72) Inventor: Kenta Matsui, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/397,127

(22) Filed: Dec. 27, 2023

(65) Prior Publication Data

US 2024/0231723 A1 Jul. 11, 2024

(30) Foreign Application Priority Data

Jan. 5, 2023 (JP) .................................. 2023-000719

(51) Int. Cl.
*G06F 3/12* (2006.01)
*G06F 3/04817* (2022.01)
*H04N 1/00* (2006.01)

(52) U.S. Cl.
CPC ........ *G06F 3/1255* (2013.01); *G06F 3/04817* (2013.01); *G06F 3/1204* (2013.01); *G06F 3/1209* (2013.01); *G06F 3/1228* (2013.01); *H04N 1/0048* (2013.01); *G06F 3/1287* (2013.01)

(58) Field of Classification Search
CPC .. G06F 3/1255; G06F 3/04817; G06F 3/1204; G06F 3/1209; G06F 3/1228; G06F 3/1287; H04N 1/0048
See application file for complete search history.

(56) References Cited

U.S. PATENT DOCUMENTS

| | | | |
|---|---|---|---|
| 2006/0087680 A1* | 4/2006 | Maeda | G06F 3/1285 358/1.15 |
| 2006/0212819 A1* | 9/2006 | Tobioka | G06F 3/04817 715/764 |
| 2008/0192121 A1* | 8/2008 | Hashimoto | H04N 1/00973 358/1.15 |
| 2014/0078524 A1* | 3/2014 | Mitsubori | G06F 3/1204 358/1.9 |
| 2015/0153973 A1* | 6/2015 | Kawaguchi | G03G 15/5004 358/1.14 |
| 2015/0156370 A1* | 6/2015 | Ichikawa | H04N 1/00408 358/1.13 |
| 2016/0219171 A1* | 7/2016 | Ebitani | H04N 1/00474 |

(Continued)

FOREIGN PATENT DOCUMENTS

JP 2017113904 A 6/2017

*Primary Examiner* — Iriana Cruz
(74) *Attorney, Agent, or Firm* — ROSSI, KIMMS & McDOWELL LLP

(57) ABSTRACT

A computer-readable storage medium storing a program for expanding a function of general-purpose software that generates print data which can be printed by a plurality of printers of a plurality of makers. The program includes a code for causing an apparatus to acquire capability information of capabilities of a printer included in the printers of the plurality of makers, a code for converting the acquired capability information to icons each representing an item of the capability information, and a code for causing the apparatus to display the converted icons on a display section.

16 Claims, 16 Drawing Sheets

(56) References Cited

U.S. PATENT DOCUMENTS

| | | |
|---|---|---|
| 2017/0180576 A1 | 6/2017 | Kaneda |
| 2020/0201585 A1* | 6/2020 | Miyajima ............. G06F 3/1207 |
| 2020/0341708 A1* | 10/2020 | Kaneda ................. G06F 3/1204 |
| 2021/0231455 A1* | 7/2021 | Nguyen ............. G01C 21/3811 |
| 2022/0385772 A1* | 12/2022 | Griffith .............. H04N 1/00233 |
| 2023/0161528 A1* | 5/2023 | Kim ...................... G06F 3/1254 |
| | | 358/1.15 |

* cited by examiner

FIG. 9

| INFORMATION | CONVERSION | ATTRIBUTE VALUE | ICON |
|---|---|---|---|
| printer-make-and-model | NO | – | – |
| print-color-mode | YES | monochrome | BW — 1101 |
| | | color | CL — 1102 |
| marker-types | YES | ink | 🖋 — 1103 |
| | | toner | ▦ — 1104 |
| media-type | YES | stationery | 📄 — 1105 |
| | | roll | 🧻 — 1106 |

Columns: 1111, 1112, 1113, 1114

|  | PRINTER 101X | PRINTER 101Y | PRINTER 101Z |
|---|---|---|---|
| printer-make-and-model | A Inc. Printer X | B Inc. Printer Y | C Inc. Printer Z |
| print-color-mode | color | color | monochrome |
| marker-types | ink | ink | toner |
| media-type | stationery | roll | stationery |

STORAGE MEDIUM ENABLING EASY GRASPING OF CAPABILITIES OF PRINTER BY ICONS, AND CONTROL METHOD

BACKGROUND OF THE INVENTION

Field of the Invention

The present invention relates to a storage medium storing a program enabling easy grasping of capabilities of a printer by icons, and a control method.

Description of the Related Art

In recent years, there is known a printer driver that operates based on an industry-standard protocol, such as Internet Printing Protocol (IPP) (hereinafter referred to as the "general-purpose printer driver"). By using this printer driver, it is possible to generate print data without using a printer driver (or a print application) designed so as to use an individual printer associated therewith. Japanese Laid-Open Patent Publication (Kokai) No. 2017-113904 discloses a print control apparatus (print client) that controls execution of printing in a printer by using a general-purpose printer driver. In a case where the general-purpose printer driver is used, when a user newly registers a printer with the print control apparatus or selects a predetermined printer from a plurality of printers, for example, a product name of the printer in question is displayed as a character string on the print control apparatus. Further, a bitmap image showing the appearance of the printer in question is sometimes displayed on the print control apparatus.

However, even when the product name or the bitmap image of the printer is displayed on the print control apparatus, it is difficult for the user to grasp what capabilities the printer has. For example, it is difficult to grasp whether the printer can perform color printing and monochrome printing, or only monochrome printing. Further, for example, it is difficult to grasp, for example, whether the printer uses an inkjet method or an electrophotographic method as the printing method.

SUMMARY OF THE INVENTION

In a first aspect of the present invention, there is provided a computer-readable storage medium storing a program for expanding a function of general-purpose software that generates print data which can be printed by a plurality of printers of a plurality of makers, the program including a code for causing an apparatus to acquire capability information of capabilities of a printer included in the printers of the plurality of makers, a code for converting the acquired capability information to an icon representing the capability information, and a code for causing the apparatus to display the converted icons on a display section.

In a second aspect of the present invention, there is provided a control method performed by executing a program for expanding a function of a general-purpose software that generates print data which can be printed by a plurality of printers of a plurality of makers, the control method including causing an apparatus to acquire capability information of capabilities of a printer included in the printers of the plurality of makers, converting the acquired capability information to an icon representing the capability information, and causing the apparatus to display the converted icon on a display section.

Further features of the present invention will become apparent from the following description of exemplary embodiments (with reference to the attached drawings).

BRIEF DESCRIPTION OF THE DRAWINGS

FIG. 9 is a conversion table showing a relationship between capability information and icons.

DESCRIPTION OF THE EMBODIMENTS

The present invention will now be described in detail below with reference to the accompanying drawings showing embodiments thereof. However, the following description of the configuration of the embodiments is given by way of example, and the scope of the present invention is not limited to the described configuration of the embodiments. For example, each component of the present invention can be replaced by a desired component which can exhibit the same function. Further, a desired component can be added.

Hereafter, a first embodiment will be described with reference to FIGS. 1 to 10.

Figure 1:
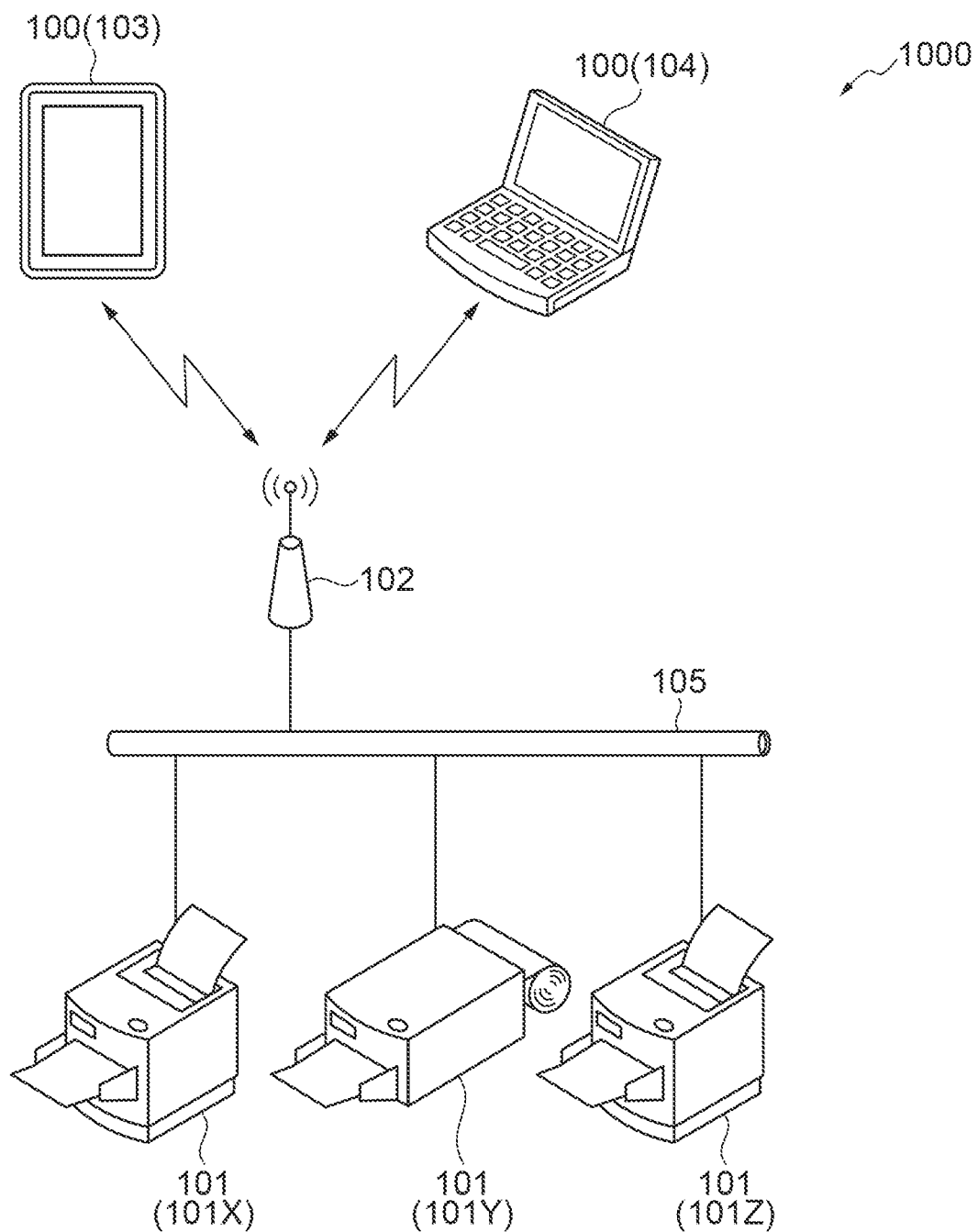
FIG. 1 is a schematic diagram showing an example of configuration of a print system according to a first embodiment.

FIG. 1 is a schematic diagram showing an example of configuration of a print system 1000. As shown in FIG. 1, the print system, 1000 includes information processing apparatuses 100 and printers 101, and these are connected via an access point (AP) 102 and a Local Area Network (LAN) 105 in a state communicable with each other. In the present embodiment, as the information processing apparatuses 100, a mobile terminal 103 and a mobile terminal 104 are used. The mobile terminal 103 and the mobile terminal 104 are each, for example, one of a laptop-type personal computer, a tablet terminal, and a smartphone. Note that the information processing apparatuses 100 are not limited to the mobile terminal 103 and the mobile terminal 104, but for example, a desktop-type personal computer can be used. Further, although the number of the disposed information processing apparatuses 100 is two, i.e. the mobile terminal 103 and the mobile terminal 104, this is not limitative, but one, or three or more information processing apparatuses 100 can be disposed.

As the printers 101, a printer 101X, a printer 101Y, and a printer 101Z are illustrated. The printers 101 are not particularly limited insofar as they are configured to be capable of performing printing, and are, for example, multifunction peripherals (MFP) in the present embodiment. The "multifunction peripheral" refers to an apparatus having at least two functions, out of a print function, a scan function, a copy function, and a facsimile function. Note that the printer 101 is not limited to the multifunction peripheral, and can be, for example, a printer having a single printer function (SFP), a copy machine, or a facsimile machine. Further, although, in the illustrated example, the number of the disposed printers 101 is three, i.e., the printers 101X to 101Z, this is not limitative, but for example, one, two, or four or more printers 101 can be disposed. Further, the information processing apparatuses 100 and the printers 101 can be connected by wireless connection or wired connection.

Figure 2:
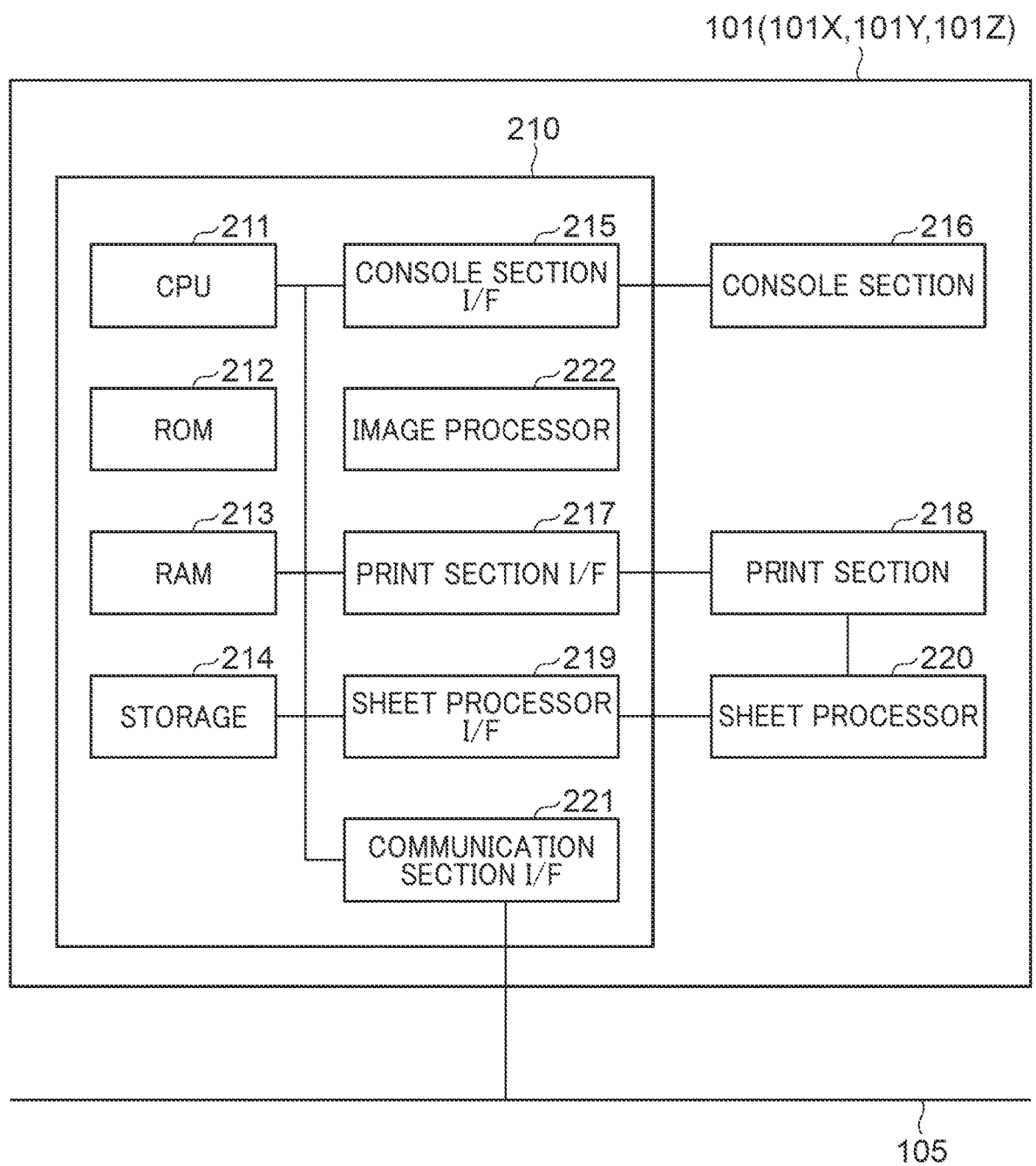
FIG. 2 is a block diagram showing a hardware configuration of a printer.

FIG. 2 is a block diagram showing a hardware configuration of the printer 100. The printer 101 shown in FIG. 2 executes printing based on print data received from the information processing apparatus 100. That is, the printer 101 has a print function for printing an image on a sheet (recording medium). The printer 101 includes a controller 210, a console section 216, a print section (printer engine) 218, and a sheet processor 220. The controller 210 integrally controls the overall operation of the printer 101. This controller 210 includes a Central Processing Unit (CPU) 211, a Read Only Memory (ROM) 212, a Random Access Memory (RAM) 213, and a storage 214. Further, the controller 210 includes a console section interface (I/F) 215, a print section I/F 217, a sheet processor I/F 219, a communication section I/F 221, and an image processor 222.

The CPU 211 is a computer that loads programs stored in the ROM 212 or the storage 214 into the RAM 213 and performs print control by executing the loaded programs. These programs include, for example, a control program for causing the CPU 211 to execute operations of each component and each means of the printer 101. The ROM 212 stores the control programs, a boot program, and so forth, which can be executed by the CPU 211. The RAM 213 is a main storage memory for the CPU 211 and is used as a work area or a temporary storage area for loading a variety of control programs. The storage 214 stores print data, image data, a variety of programs, a variety of setting information, and so forth. Although in the present embodiment, as the storage 214, an auxiliary storage device, such as a Hard Disk Drive (HDD), is used, this is not limitative, but for example, a nonvolatile memory, such as a Solid State Drive (SSD), can be used. Note that although in the present embodiment, the CPU 211, the ROM 212, the RAM 213, and the storage 214 are each singly provided, this is not limitative, but they can each be disposed in plurality.

The console section I/F 215 is for interfacing between the controller 210 and the console section 216. The console section 216 includes a display section having a touch panel function, a variety of hard keys, and so forth, and functions of a display section for displaying a variety of information and a reception section for receiving an instruction from a user. The print section I/F 217 is for interfacing between the controller 210 and the print section 218.

The print section I/F 217 receives a print job from the information processing apparatus 100. The print job is analyzed by the image processor 222 and is generated as image data. The image data is transferred to the print section 218. The print section 218 prints an image based on the image data on a sheet fed from a sheet feed cassette. Although depending on a type of the printer 101, a plurality of types of sheets can be fed from a plurality of sheet feed cassettes. The print section 218 is compatible with these sheets. Note that the information on the types of sheets which can be fed by the print section 218 is notified to the controller 210 via the print section I/F 217, in advance (e.g. when the printer 101 is started), and is stored in the storage 214 or the RAM 213. Further, as the printing method of the print section 218, although depending on a type of the printer 101, for example, an electrophotographic method, an inkjet method, a heat transfer method, or the like is used. The controller 210 is connected to the LAN 105 via the communication I/F 221. The communication section I/F 221 transmits a variety of information, such as image data, to the information processing apparatus 100 on the LAN 105 and receives a variety of information, such as a print job, from the information processing apparatus 100 on the LAN 105.

The image processor 222 has a Raster Image Processor (RIP) function. With this, the image processor 222 can develop a print job received from the information processing apparatus 100 to generate image data used for printing. Further, the image processor 222 can also perform resolution conversion and correction of image data. Note that although in the present embodiment, the image processor 222 is implemented by a hardware circuit (such as an Application-Specific Integrated Circuit (ASIC) or Field-Programmable Gate Array (FPGA)), this is not limitative. For example, the image processor 222 can further have a processor for image processing, and through execution of an image processing program by the processor, image processing and expansion into image data can be performed. Alternatively, for example, the CPU 211 can execute a program for performing image processing to perform image processing and expansion into image data, or image processing and/or the like can be performed by a combination of the above-mentioned types of processing operations. The sheet processor I/F 219 is for interfacing between the controller 210 and the sheet processor 220. The sheet processor 220 receives a control command from the controller 210 and performs post-processing on a sheet printed by the print section 218 according to the received control command. The post-processing is not particularly limited and includes, for example, processing for aligning a plurality of sheets, processing for punching a sheet, and processing for binding a plurality of sheets.

Figure 3:
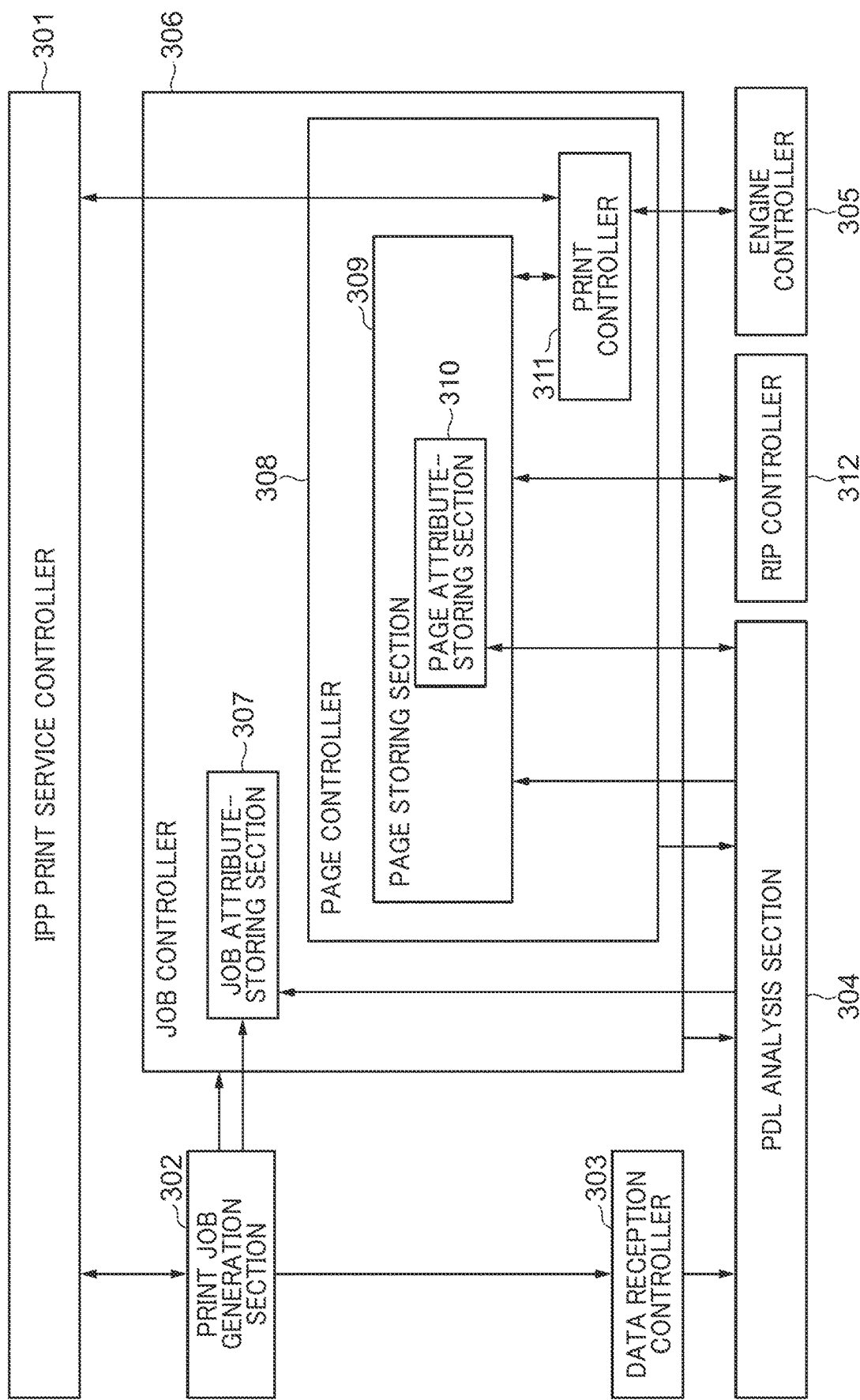
FIG. 3 is a block diagram showing a software configuration of the printer.

FIG. 3 is a block diagram showing a software configuration of the printer 101. In the present embodiment, each functional block in the block diagram shown in FIG. 3 is realized by the CPU 211 that executes an associated program loaded into the RAM 213. As shown in FIG. 3, the software configuration of the printer 101 includes an IPP print service controller 301, a print job generation section 302, a data reception controller 303, a Page Description Language (PDL) analysis section 304, an engine controller 305, a job controller 306, and a RIP controller 312. Further, the job controller 306 includes a job attribute-storing section 307 and a page controller 308. The page controller 308 includes a page storing section 309 and a print controller 311. The page storing section 309 includes a page attribute-storing section 310.

The IPP print service controller 301 acquires capability information of the printer 101 (hereinafter sometimes simply referred to as the "capability information") from the engine controller 305 via the print controller 311. The "capability information" refers to information on the capabilities of the printer 101, and in the present embodiment, as the information, there can be mentioned the following three information items associated with printing which can be executed by the printer 101: The first information is information on whether the printer 101 can perform color printing (including monochrome printing) or monochrome printing. That is, the first information is information on whether the printer 101 is a color printer or a monochrome printer (information on a print color mode). The second information is information on whether the printing method (marker type) used by the printer 101 is the inkjet method or the electrophotographic method. The third information is information on a sheet which can be used by the printer 101 (information on a media type). Note that the capability information is not limited to the information items associated with printing. Further, apparatus information concerning the printer 101 includes not only the capability information, but also name information concerning the name of the printer 101 and associated with the capability information. Therefore, the apparatus information includes the capability information and the name information. The engine controller 305 preferably holds the apparatus information (the capability information and the name information) at product shipment of the printer 101, in advance. Note that the apparatus information can be updated when an option device is connected to the printer 101 or the software is updated in the printer 101.

Next, a process performed when a print job is received from the information processing apparatus 100 will be described. The IPP print service controller 301 receives a print job based on the IPP standard from the information processing apparatus 100. Then, the IPP Print service controller 301 sends the print job to the print job generation section 302. The print job generation section 302 receives the print job from the IPP print service controller 301. Then, the print job is written into the data reception controller 303 and is registered in the job controller 306 as a new job. With this, start of printing is requested. Then, the print job generation section 302 sends print setting information to be applied to the print job to the job attribute-storing section 307. Further, the data reception controller 303 uses a buffer area in the storage 214 and temporarily stores print jobs in the buffer area, on a print job-by-print job basis. The data reception controller 303 sends each print job to the PDL analysis section 304. The job controller 306 instructs the PDL analysis section 304 to execute PDL analysis processing on the print job. Then, the PDL analysis section 304 generates page data including intermediate drawing data and page attributes according to the PDL specification and the generated page data is stored by the page storing section 309 and the page attribute-storing section 310. Note that the page data generated by the PDL analysis section 304 is stored by the page storing section 309 and the page attribute-storing section 310, on a page-by-page basis.

The attributes stored by the job attribute-storing section 307 include "sheet type", "the number of copies", "Nup (aggregation printing)", "printed-side (single-sided/double-sided) setting", "color/monochrome", "finishing setting", and so forth, which are set as the IPP job attributes. These attributes are all managed by the job attribute-storing section 307 in a state associated with a job ID. The page controller 308 controls the page analysis processing by the PDL analysis section 304, the RIP processing by the RIP controller 312, and the print control processing by the print controller 311. The print controller 311 acquires RIP-processed image data from the page storing section 309 and transfers the image data to the engine controller 305 after performing color separation into cyan, magenta, yellow, and black (CMYK). The engine controller 305 receives the image data separated into CMYK from the print controller 311 on a page-by-page basis and controls the print section 218 to execute processing for printing each page.

Figure 4:
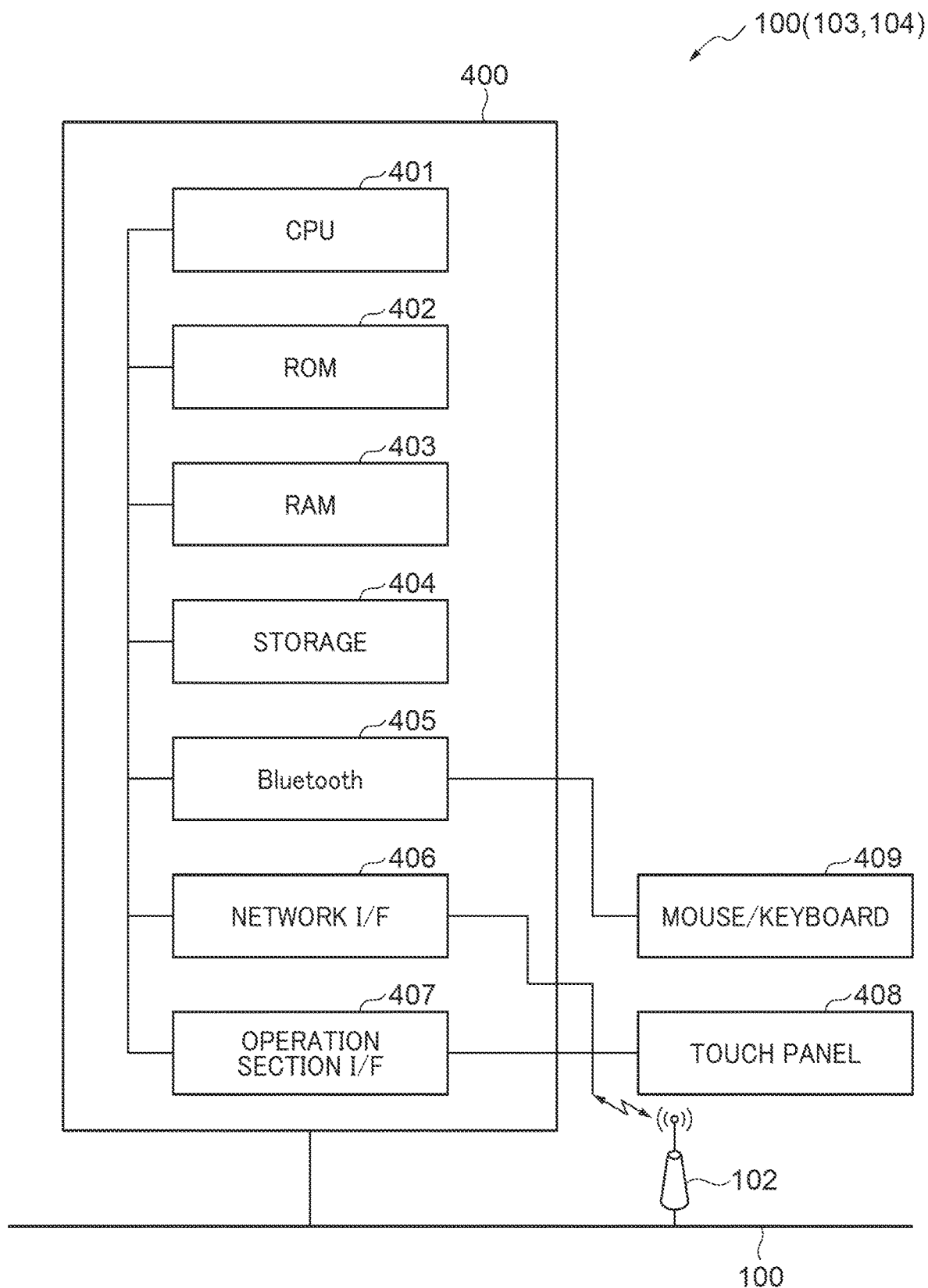
FIG. 4 is a block diagram showing a hardware configuration of an information processing apparatus.

FIG. 4 is a block diagram showing a hardware configuration of the information processing apparatus 100. As shown in FIG. 4, the information processing apparatus 100 includes a controller 400, a mouse and keyboard 409, and a touch panel 408. The controller 400 integrally controls the overall operation of the information processing apparatus 100. The controller 400 includes a CPU 401, a ROM 402, a RAM 403, a storage 404, a Bluetooth (registered trademark) 405, a network I/F 406, and an operation section I/F 407. The CPU 401 is a computer that loads programs stored in the ROM 402 or the storage 404 as the storing means into the RAM 403 and executes the loaded programs to perform calculation processing. These programs include control programs (control programs for the information processing apparatus 100) for causing the CPU 401 to execute operations of components and means of the information processing apparatus 100 (method of controlling the information processing apparatus 100). The ROM 402 stores the control programs, a boot program, and so forth, which can be executed by the CPU 401. The RAM 403 is a main storage memory for the CPU 401 and is used as a work area or a temporary storage area for loading a variety of control programs. The storage 404 stores application data, print data, a variety of programs, a variety of setting information, and so forth. Although in the present embodiment, an SSD is used as the storage 404, this is not limitative, but for example, an HDD can be used.

The Bluetooth 405 is used for connecting to the mouse and keyboard 409 to use them. The network I/F 406 is for connecting, for example, to a wireless LAN. The controller 400 is connected to the AP 102 via the network I/F 406. The touch panel 408 is connected to the controller 400 via the operation section I/F 407 to perform drawing on a liquid crystal screen and detection of a user's touch input. Note that although in the present embodiment, the CPU 401, the ROM 402, the RAM 403, and the storage 404 are each singly provided, this is not limitative, but they can be provided in plurality. The operation section I/F 407 is for interfacing between the controller 400 and the touch panel 408. The touch panel 408 has a display section having a touch panel function, and functions as a display section for displaying a variety of information and a reception section for receiving an instruction from a user.

Figure 5:
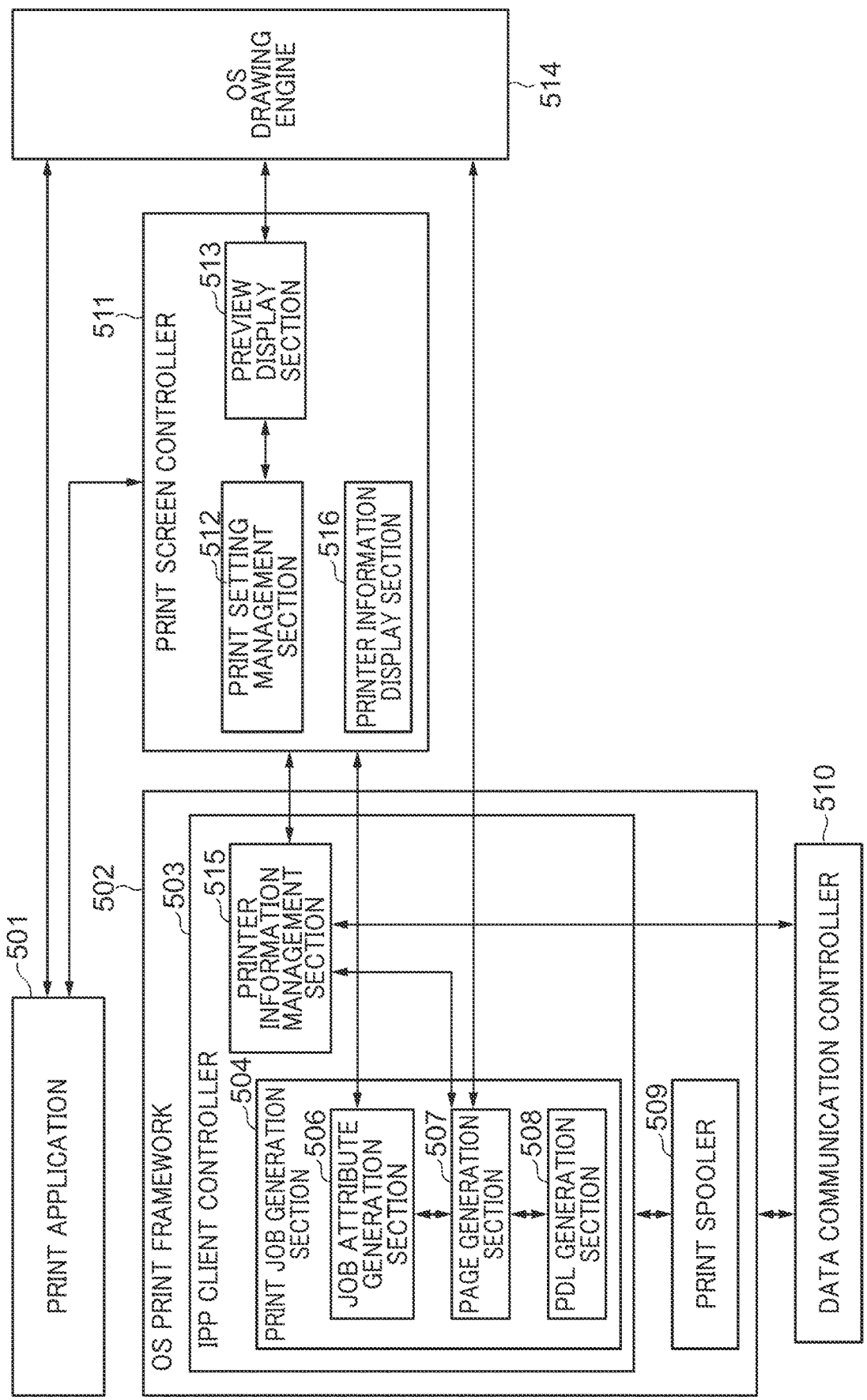
FIG. 5 is a block diagram showing a software configuration of the information processing apparatus.

FIG. 5 is a block diagram showing a software configuration of the information processing apparatus 100. In the present embodiment, each functional block in the block diagram shown in FIG. 5 is realized by the CPU 401 that executes an associated programs loaded into the RAM 403. As shown in FIG. 5, the software configuration of the information processing apparatus 100 includes a print application 501, an operating system (OS) print framework 502, a data communication controller 510, a print screen controller 511, and an OS drawing engine 514. The OS print framework 502 includes an IPP client controller 503 and a print spooler 509. The IPP client controller 503 includes a print job generation section 504 and a printer information management section 515. The print job generation section 504 includes a job attribute generation section 506, a page generation section 507, and a PDL generation section 508. The print screen controller 511 includes a print setting management section 512, a preview display section 513, and a printer information display section 516.

The print application 501 operates on the information processing apparatus 100 and provides application functions of, for example, a word processor and a spreadsheet to a user. Further, the print application 501 not only draws a graphical user interface (GUI) for a user operation via the OS drawing engine 514, but also generates print data. When a user calls the print function on the print application 501, the print application 501 calls the print screen controller 511. Each item of page data generated by the OS drawing engine 514 is sent to the preview display section 513 before the start of printing and is sent to the page generation section 507 after the start of printing. The print setting management section 512 acquires the capability information of each of the printers 101, i.e., the printer 101X, the printer 101Y, and the printer 101Z via the printer information management section 515 and generates a UI screen for print settings associated with the capability information of each printer 101. The printer information display section 516 displays the product name of the printer 101 as the name information of the printer 101. The print job generation section 504 generates a print job according to an instruction from the print screen controller 511. The printer information management section 515 holds the capability information acquired from each printer 101. The print spooler 509 sequentially transfers the print job generated by the print job generation section 504 to the printer 101 via the data communication controller 510.

The job attribute generation section 506 and the page generation section 507 start processing upon receipt of an instruction for generating print data from the print screen controller 511. The job attribute generation section 506 generates job setting information of an IPP job in response to an instruction from the print setting management section 512. The page generation section 507 acquires page data generated by the OS drawing engine 514 in the order of pages. After that, the page generation section 507 cooperates with the PDL generation section 508 to convert the page data into PDL data which can be processed by the printer 101. The PDL format which can be processed by the printer 101 is acquired from the printer information management section 515.

Figure 6:
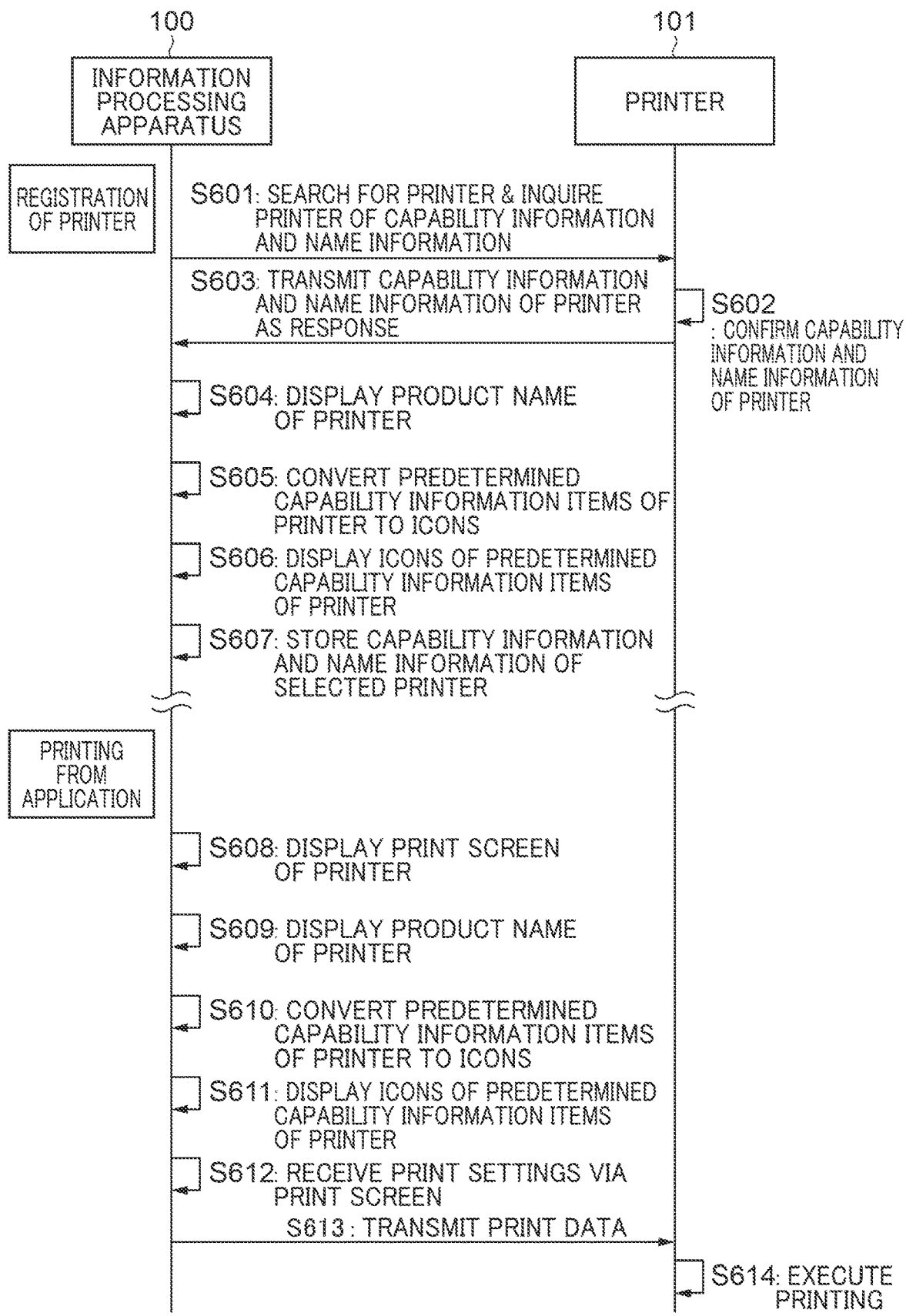
FIG. 6 is a sequence diagram showing a process performed between the information processing apparatus and the printer.

FIG. 6 is a sequence diagram showing a process performed between the information processing apparatus 100 and the printer 101. The sequence diagram shown in FIG. 6 shows the process from registration of the printer 101 in the information processing apparatus 100 to printing performed by the printer 101. Further, the information processing apparatus 100 in this sequence diagram shown in FIG. 6 can be any of the mobile terminal 103 and the mobile terminal 104, and further, the printer 101 can be one of the printer 101X, the printer 101Y, and the printer 101Z. FIG. 9 is a conversion table showing a relationship between the capability information and icons. This conversion table shown in FIG. 9 is stored in the ROM 402 or the storage 404 in advance. As shown in FIG. 6, in a step S601, the information processing apparatus 100 searches for the printer 101 and inquire the printer 101 of the capability information and name information of the printer 101, i.e., the apparatus information of the printer 101.

In a step S602, the printer 101 confirms the capability information and name information of the printer 101 in response to the inquiry received in the step S601.

In a step S603, the printer 101 transmits the capability information and the name information to the information processing apparatus 100 as a response.

In a step S604, the information processing apparatus 100 receives the capability information and the name information transmitted in the step S603 as the response, and then displays the name information, i.e., the product name of the printer 101, on the printer information display section 516.

In a step S605, the information processing apparatus 100 converts predetermined capability information items of the capability information received in the step S604 to icons representing the capability information items, respectively. This conversion process will be described hereinafter with reference to FIG. 8.

In a step S606, the information processing apparatus 100 displays the icons formed by the conversion in the step S605 on the printer information display section 516. The icons displayed in the step S606 are not particularly limited, but for example, any of six icons appearing in FIG. 9 can be displayed. Referring to FIG. 9, a monochrome printer icon 1101 represents that the printer 101 is capable of performing monochrome printing. A color printer icon 1102 represents that the printer 101 is capable of performing color printing. An inkjet method icon 1103 represents that the printing method used by the printer 101 is the inkjet method. An electrophotographic method icon 1104 represents that the printing method used by the printer 101 is the electrophotographic method. A sheet paper icon 1105 represents that sheets which can be used by the printer 101 are sheets of regular sizes (such as an A size and a B size). A roll paper icon 1106 represents that sheets which can be used by the printer 101 are roll paper sheets.

In a step S607, the information processing apparatus 100 stores the capability information and the name information received in the step S604, in the printer information management section 515.

In a step S608, in the information processing apparatus 100, the print function is called by the print application 501 operated by a user. Then, the information processing apparatus 100 displays a print screen associated with the capability information stored in the step S607.

In a step S609, the information processing apparatus 100 refers to the name information stored in the step S607 and displays the product name on the printer information display section 516.

In a step S610, the information processing apparatus 100 converts the predetermined capability information items of the capability information stored in the step S607 to the icons, respectively.

In a step S611, the information processing apparatus 100 displays the icons formed by the conversion in the step S610 on the printer information display section 516.

In a step S612, the information processing apparatus 100 receives an instruction for the print settings from the user on the print screen displayed in the step S608, and receives selection of a print button by the user.

In a step S613, in the information processing apparatus 100, the IPP client controller 503 generates print data based on the print settings received in the step S612. Then, the information processing apparatus 100 transmits the print data to the printer 101.

In a step S614, the printer 101 receives the print data transmitted in the step S613 and executes printing.

As mentioned hereinabove, in the sequence diagram shown in FIG. 6, the printer 101 can be one of the printer 101X, the printer 101Y, and the printer 101Z. Therefore, the information processing apparatus 100 can communicate with at least one of the printer 101X, the printer 101Y, and the printer 101Z. For example, in a case where the information processing apparatus 100 communicates with the printer 101X, the information processing apparatus 100 acquires the capability information of the printer 101X, and the acquired capability information is converted to icons and the icons are displayed. Further, in a case where the information processing apparatus 100 communicates with the printer 101X, the printer 101Y, and the printer 101Z, the information processing apparatus 100 acquires the capability information on a printer-by-printer basis, and the capability information of each printer 101 is converted to icons and the icons are displayed.

Figure 7:
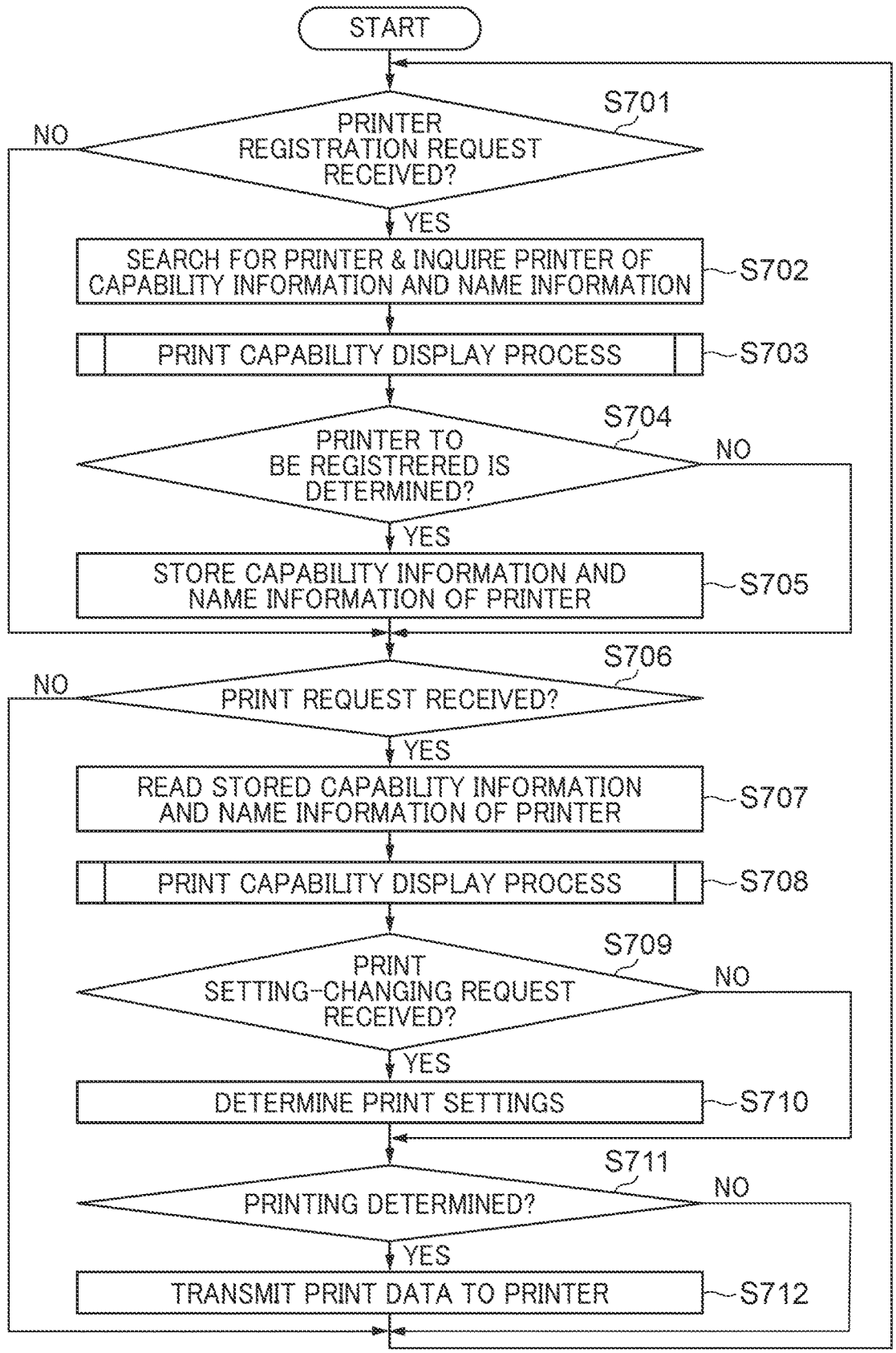
FIG. 7 is a flowchart of a process performed by the information processing apparatus.

FIG. 7 is a flowchart of the process performed by the information processing apparatus 100. The flowchart shown in FIG. 7 shows the process in which the information processing apparatus 100 searches for and registers the printer 101 and then transmits print data to the printer 101. Referring to FIG. 7, in a step S701, the IPP client controller 503 of the information processing apparatus 100 determines whether or not a registration request from a user who desires to register the printer 101 in the information processing apparatus 100 has been received. If it is determined in the step S701 that the registration request has been received, the process proceeds to a step S702. On the other hand, if it is determined in the step S701 that no registration request has been received, the process proceeds to a step S706.

In the step S702, the printer information management section 515 searches for the printer 101 and inquires the printer 101 of the capability information and the name information (apparatus information) of the printer 101 by using a "Get-printer-attributes" command of the IPP protocol. In the present embodiment, the capability information can be inquired by the "Get-printer-attributes" command. As an attribute of this capability information, "printer-make-and-model (the maker name and product name of the printer 101)" is specified. As other attributes, "print-color-mode (print color)", "marker-types (printing method)", and "media-type (sheet used for printing)" are specified. Note that the attributes of the capability information are not limited to these, but there are a lot of other attributes other than these.

Figure 8:
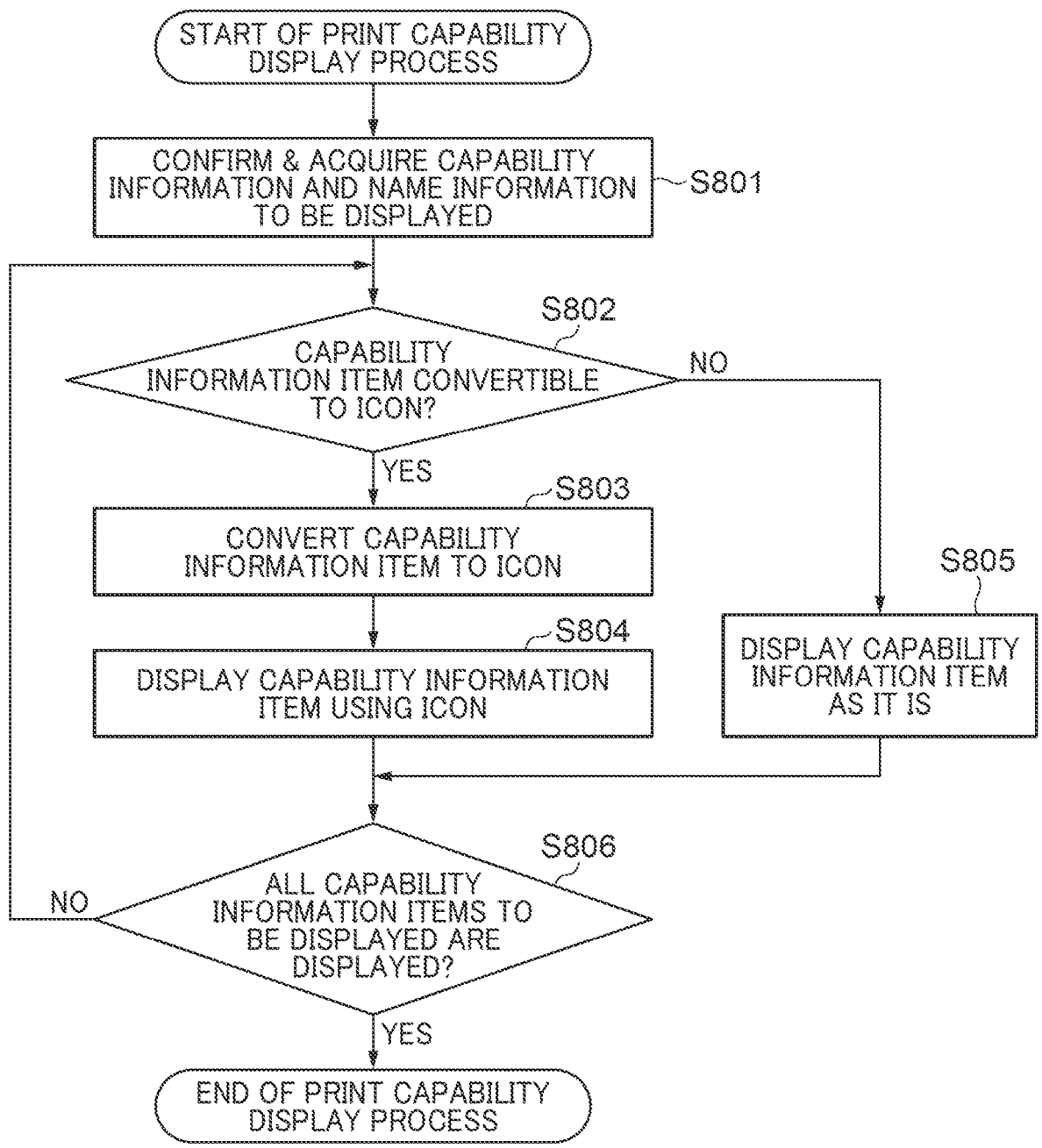
FIG. 8 is a flowchart of a print capability display process performed in a step S703 (subroutine) of the flowchart in FIG. 7.
Figures 10A, 10B:
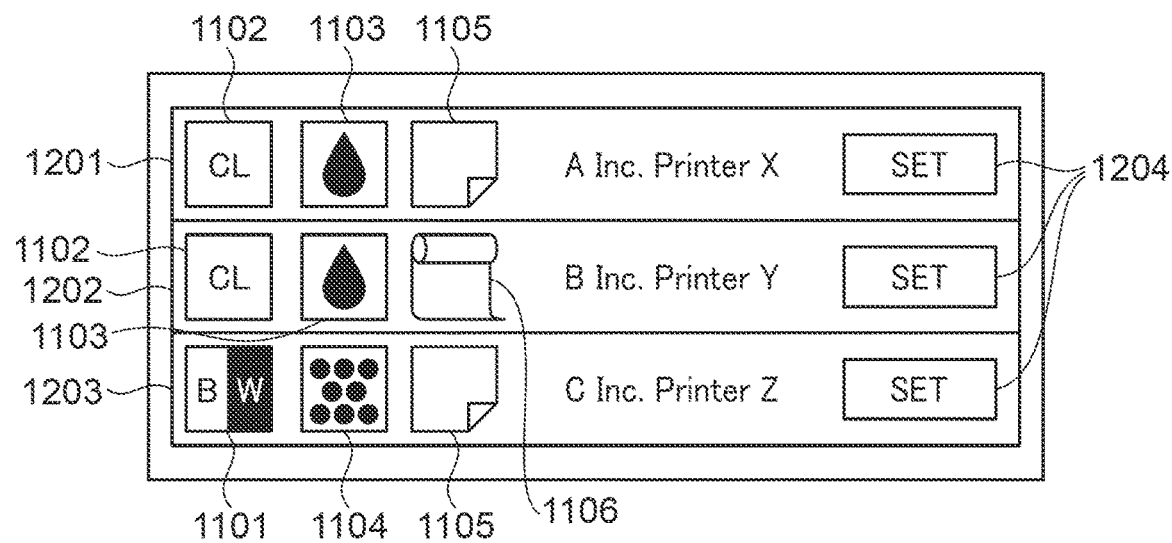
FIGS. 10A and 10B are diagrams showing an example of the capability information of the printers.

In a step S703, the printer information management section 515 causes the capability information acquired in the step S702 to be displayed on the printer information display section 516 via the print screen controller 511. Here, a print capability display process performed in the step S703 for displaying the capability information will be described with reference to FIGS. 8 and 10. FIG. 8 is a flowchart of the print capability display process performed in the step S703 (subroutine) of the process shown in FIG. 7. FIGS. 10A and 10B are diagrams showing an example of the capability information of the printers. FIG. 10A shows the capability information of the printer 101X, the printer 101Y, and the printer 101Z, based on the IPP protocol, and the name information of each printer 101. FIG. 10B shows an example of the display of the capability information of the printer 101X, the printer 101Y, and the printer 101Z, converted to the icons, and the name information of each printer 101.

As shown in FIG. 10A, in the column of the printer 101X, as the name information, i.e., "printer-make-and-model" of the printer 101X, "A Inc. Printer X" representing the maker and the product name of the printer 101X is shown. Further, as the print color, i.e., "print-color-mode" of the printer 101X, "color (color printer)" is shown. As the printing method, i.e., "marker-types", "ink (inkjet method)" is shown. As the sheet which can be used for printing, i.e., "media-type", "stationery (regular size sheet paper)" is shown. In the column of the printer 101Y, as the name information, i.e., "printer-make-and-model" of the printer 101Y, "B Inc. Printer Y" representing the maker and the product name of the printer 101Y is shown. Further, as the print color, i.e., "print-color-mode" of the printer 101Y, "color" is shown. As the printing method, i.e., "marker-types", "ink" is shown. As the sheet which can be used for printing, i.e., "media-type", "roll (roll paper)" is shown. In the column of the printer 101Z, as the name information, i.e., "printer-make-and-model" of the printer 101Z, "C Inc. Printer Z" is shown. Further, as the print color, i.e., "print-color-mode" of the printer 101Z, "monochrome (monochrome printer)" is shown. As the printing method, i.e., "marker-types", "toner (electrophotographic method)" is shown. As the sheet which can be used for printing, i.e., "media-type", "stationery" is shown.

Referring to FIG. 8, in a step S801, the printer information management section 515 confirms the capability information and the name information to be displayed on the printer information display section 516, and acquires them (acquisition step). Here, the processing for displaying the capability information and name information of the printer 101X is described by way of example.

In a step S802, the printer information management section 515 determines whether or not a selected one of the capability information items (attributes) confirmed in the step S801 can be converted (is convertible) to an icon (determination step). In the present embodiment, the determination in the step S802 is performed based on the conversion table shown in FIG. 9. A table item 1111 indicates an attribute of the capability information and the name information. A table item 1112 indicates whether or not each capability information item (attribute) can be converted to an icon. Specifically, in a case where the table item 1112 is "YES", this indicates that the capability information item (attribute) can be converted to an icon, whereas in a case where the table item 1112 is "NO", this indicates that the capability information item (attribute) cannot be converted to an icon. The values in the table item 1112, associated with "print-color-mode (color print)", "marker-types (printing method)", and "media-type (sheet)" in the table item 1111, are all set to "YES", and hence these capability information items can be converted to the respective icons. Note that "printer-make-and-model (name information)" in the table item 1111 cannot be converted to an icon, and hence "NO" is set in the table item 1112. A table item 1113 indicates an attribute value which can be assumed by an associated capability information item (attribute) which can be converted to an icon. A table item 1114 indicates a bitmap image of an icon (one of the monochrome printer icon 1101 to the roll paper icon 1106) associated with an attribute value. The monochrome printer icon 1101 is associated with the attribute value of "monochrome". The color printer icon 1102 is associated with the attribute value of "color". The inkjet method icon 1103 is associated with the attribute value of "ink". The electrophotographic method icon 1104 is associated with the attribute value of "toner". The sheet paper icon 1105 is associated with the attribute value of "stationery". The roll paper icon 1106 is associated with the attribute value of "roll". Then, if it is determined in the step S802 that the selected capability information item (attribute) can be converted to an icon, the process proceeds to a step S803. On the other hand, if it is determined in the step S802 that t the selected capability information item (attribute) cannot be converted to an icon, the process proceeds to a step S805. For example, in the case of the printer 101X, the capability information items "print-color-mode", "marker-types", and "media-type" can be converted to icons, and hence when the selected capability information item (attribute) is one of them, the process proceeds to the step S803. Further, in the case of the printer 101X, the name information, i.e., "printer-make-and-model" is a capability information item (attribute) which cannot be converted to an icon, and hence the process proceeds to the step S805.

In the step S803, the printer information display section 516 converts the selected capability information (attribute) to a predetermined icon based on the conversion table shown in FIG. 9 (conversion step). As a result, since the capability information item "print-color-mode" of the printer 101X is "color" and hence is converted to the color printer icon 1102. Further, the capability information item "marker-types" of the printer 101X is "ink" and hence is converted to the inkjet method icon 1103. Further, the capability information item "media-type" of the printer 101X is "stationery" and hence is converted to the sheet paper icon 1105.

In a step S804, the printer information management section 515 causes the selected capability information item converted to the icon in the step S803 to be displayed on the printer information display section 516 via the print screen controller 511 (displaying step).

In a step S806, the printer information management section 515 determines whether or not all of the capability information items to be displayed in the step S804 have been displayed. If it is determined in the step S806 that all of the capability information items have been displayed, the present process is terminated. On the other hand, if it is determined in the step S806 that any of the capability information items has not been displayed, the process returns to the step S802 to select one of the capability information items (attributes) which have not been selected, and the step S802 et seq. are sequentially executed.

In the step S805 after execution of the step S802, the printer information display section 516 directly displays a character string of the setting of "A Inc. Printer X" (see FIG. 10) of "printer-make-and-model" as it is.

In the case of the printer 101X, a display 1201 appearing in FIG. 10B is displayed. The display 1201 includes the color printer icon 1102, the inkjet method icon 1103, the sheet paper icon 1105, and the character string of the name information of the printer 101X. Further, in the case of the printer 101Y, a display 1202 appearing in FIG. 10B is displayed. The display 1202 includes the color printer icon 1102, the inkjet method icon 1103, the roll paper icon 1106, and the character string of the name information of the printer 101Y. Further, in the case of the printer 101Z, a display 1203 appearing in FIG. 10B is displayed. The display 1203 includes the monochrome printer icon 1101, the electrophotographic method icon 1104, the sheet paper icon 1105, and the character string of the name information of the printer 101Z. Thus, the information processing apparatus 100 can display the icons for each printer 101. Further, the information processing apparatus 100 can also display the name information together with the icons.

Referring again to the flowchart in FIG. 7, the description of the process performed by the information processing apparatus 100 is continued. As shown in FIG. 7, in a step S704, the printer information management section 515 determines whether or not the printer 101 to be registered in the information processing apparatus 100 has been determined. The determination in the step S704 is performed based on whether or not any of setting buttons 1204 (see FIG. 10B) included in the displays 1201 to 1203, respectively, has been operated. For example, in a case where the setting button 1204 of the display 1201 has been operated, the printer information management section 515 determines that registration of the printer 101X has been determined (registration step). If it is determined in the step S704 that the printer 101 to be registered has been determined, the process proceeds to a step S705, whereas if it is determined in the step S704 that the printer 101 to be registered has not been determined, the process proceeds to the step S706.

In the step S705, the printer information management section 515 stores the capability information and name information of the printer 101 determined to be registered in the step S704 in the storage 404 of the information processing apparatus 100. For example, in a case where the printer 101X is registered, all of the capability information items of the printer 101X, inquired and acquired in the step S702, are stored. The same is applied to the printer 101Y and the printer 101Z.

In the step S706, the IPP client controller 503 determines whether or not a print request, i.e. a print instruction to the printer 101 (instruction step) has been received from the print application 501 of the information processing apparatus 100. If it is determined in the step S706 that the print request has been received, the process proceeds to a step S707. On the other hand, if it is determined in the step S706 that no print request has been received, the process returns to the step S701, and the step S701 et seq. are executed.

In the step S707, the printer information management section 515 reads the capability information stored in the step S705.

In a step S708, the printer information management section 515 causes the capability information read in the step S707 to be displayed on the printer information display section 516 as a candidate of the printer 101 where printing is to be executed (printing destination). The print capability display process in this step S708 is the same as the print capability display process in the step S703, and hence description thereof is omitted.

In a step S709, the printer information management section 515 determines whether or not a print setting-changing request, i.e., a request for changing the print settings has been received. In the present embodiment, as shown in FIG. 10B, as the candidates of the printing destination, the name information of the printer 101X, the name information of the printer 101Y, and the name information of the printer 101Z are displayed in the mentioned order from the top. Let it be assumed here that the printer 101X positioned on the top is set as the default printing destination. Note that the printer 101 used last time can be set as the default printing destination. A case where the print setting-changing request has been received includes, for example, a case where the printer 101 as the printing destination has been changed and a case where any of the print settings, such as "the number of copies" or "Nup (aggregation printing)", has been changed without changing the printer 101 as the printing destination. Then, if it is determined in the step S709 that the print setting-changing request has been received, the process proceeds to a step S710. On the other hand, if it is determined in the step S709 that no print setting-changing request has been received, the process proceeds to a step S711.

In the step S710, the printer information management section 515 determines the print settings according to the print setting-changing request received in the step S709.

In the step S711, the printer information management section 515 determines via the print screen controller 511 whether or not the printing with the print settings determined in the step S710 has been determined. In the present embodiment, the determination in the step S711 is performed based on whether or not a print button (not shown) on the print screen has been operated. If the print button has been operated, it is determined that the printing has been determined. Then, if it is determined in the step S711 that the printing has been determined, the process proceeds to a step S712. On the other hand, if it is determined in the step S711 that the printing has not been determined, the process returns to the step S701, and the step S701 et seq. are executed.

In the step S712, the IPP client controller 503 transmits the print data to the printer 101 according to the information obtained from the print screen controller 511 and the information obtained from the printer information management section 515. After that, the process returns to the step S701, and the step S701 et seq. are executed.

As described above, in the information processing apparatus 100, before registering the printer 101 (step S704), the icons of the capability information items of the printer 101 are displayed (step S703). Further, before instructing the printer 101 to print (step S709), the icons of the capability information of the printer 101 are displayed (step S708). By displaying the icons as described above, it is possible to easily grasp what capabilities each printer 101 has. With this, it is possible to quickly select from the plurality of printers 101 the printer 101 desired to be registered in the information processing apparatus 100 or desired to execute printing according to an instruction from the information processing apparatus 100. Further, by converting the capability information items to the icons, the visibility obtained when confirming the capability information items is improved.

Hereafter, a second embodiment will be described with reference to FIGS. 11 and 12, but the description is given mainly of different points from the above-described first embodiment, and description of the same points is omitted. In the present embodiment, the printing sequence does not require registration of a printer.

Figure 11:
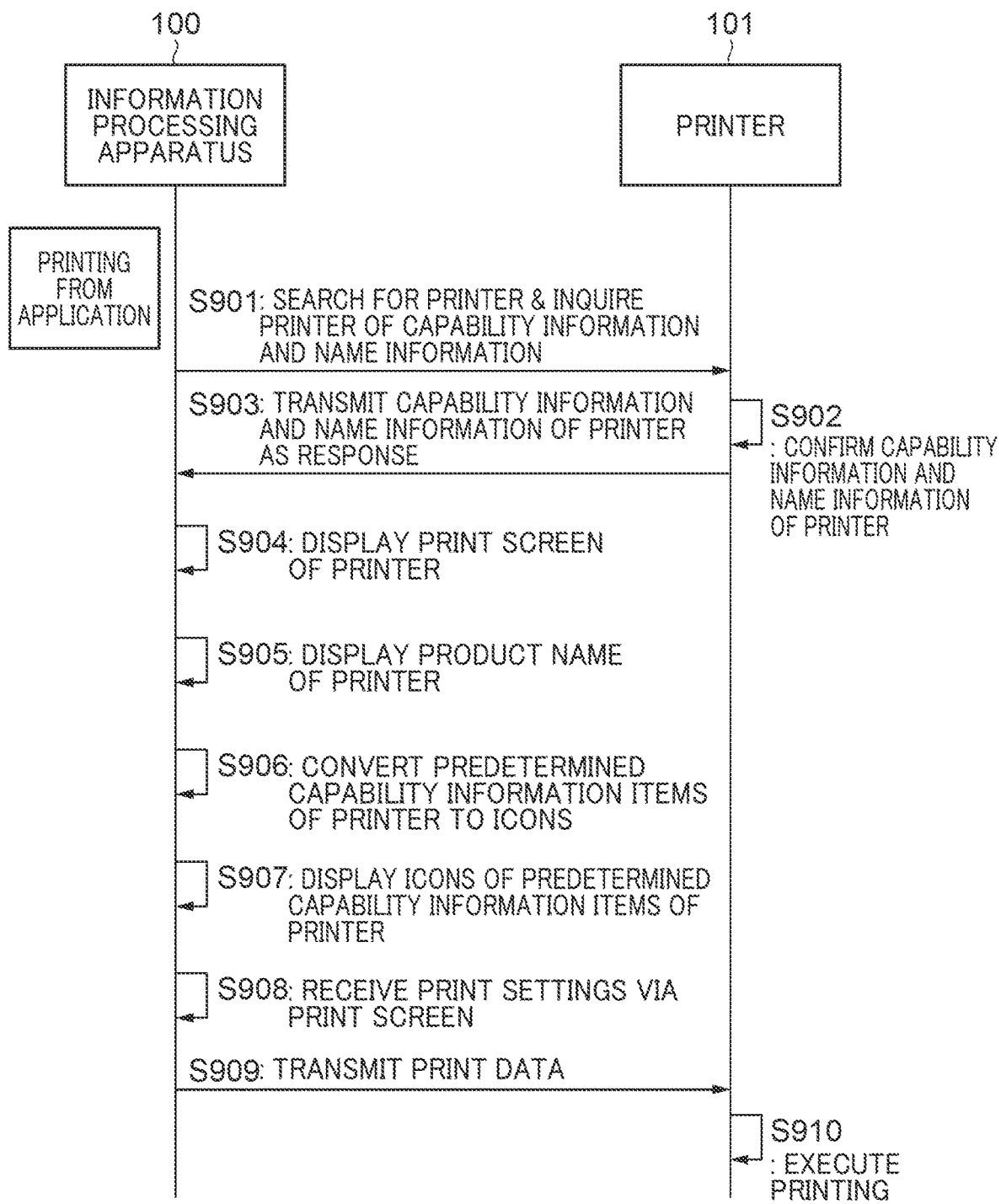
FIG. 11 is a sequence diagram showing a process performed between the information processing apparatus according to a second embodiment and the printer.

FIG. 11 is a sequence diagram showing a process performed according to the second embodiment between the information processing apparatus 100 and the printer 101. The sequence diagram shown in FIG. 11 shows the process up to printing performed by the printer 101. Referring to FIG. 11, in a step S901, when the user calls the print function from the print application 501, the information processing apparatus 100 searches for the printer 101 and inquires the printer 101 of the capability information and name information of the printer 101.

In a step S902, the printer 101 confirms the capability information and name information of the printer 101 in response to the inquiry received in the step S901.

In a step S903, the printer 101 transmits the capability information and the name information to the information processing apparatus 100 as a response.

In a step S904, the information processing apparatus 100 displays a print screen associated with the capability information received in the step S903 as the response on the printer information display section 516.

In a step S905, the information processing apparatus 100 refers to the name information received in the step S903 as the response and displays this product name on the printer information display section 516.

In a step S906, the information processing apparatus 100 converts predetermined items of the capability information received in the step S903 to icons.

In a step S907, the information processing apparatus 100 displays the icons formed by the conversion in the step S906 on the printer information display section 516.

In a step S908, the information processing apparatus 100 receives an instruction for the print settings from the user on the print screen displayed in the step S904, and receives selection of the print button by the user.

In a step S909, the information processing apparatus 100 controls the IPP client controller 503 to generate print data based on the print settings received in the step S908. Then, the information processing apparatus 100 transmits the print data to the printer 101.

In a step S910, the printer 101 receives the print data transmitted in the step S909 and executes printing.

Figure 12:
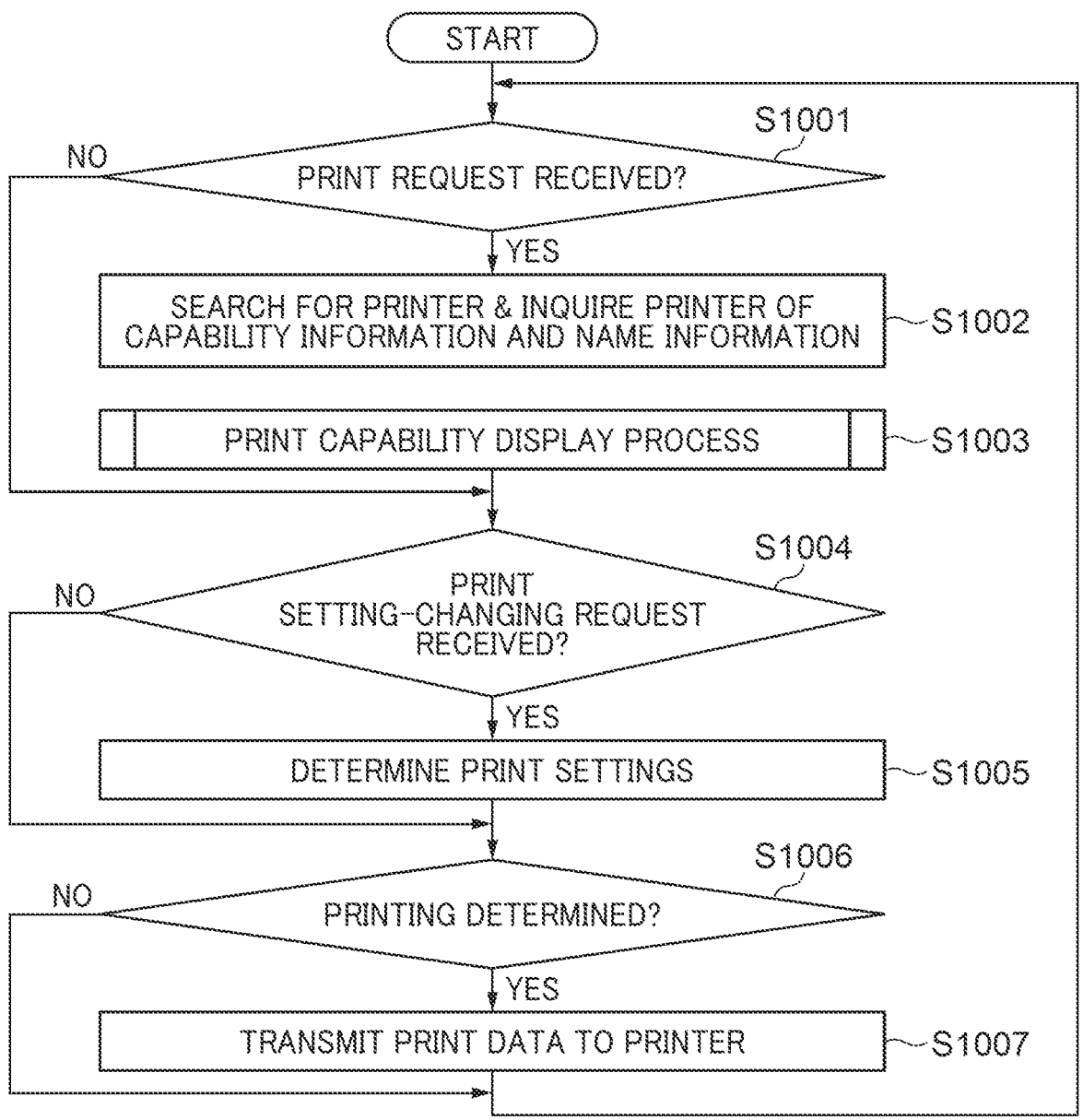
FIG. 12 is a flowchart of a process performed by the information processing apparatus.

FIG. 12 is a flowchart of a process performed by the information processing apparatus. The flowchart in FIG. 12 shows the process up to transmission of print data from the information processing apparatus 100 to the printer 101. Referring to FIG. 12, in a step S1001, the IPP client controller 503 determines whether or not a print request has been received from the print application 501 of the information processing apparatus 100. If it is determined in the step S1001 that a print request has been received, the process proceeds to a step S1002. On the other hand, if it is determined in the step S1001 that a print request has not been received, the process proceeds to a step S1004.

In the step S1002, the printer information management section 515 searches for the printer 101 and inquires the printer 101 of the capability information and name information of the printer 101 by using the "Get-printer-attributes" command of the IPP protocol.

In a step S1003, the printer information management section 515 causes the capability information acquired in the step S1002 to be displayed on the printer information display section 516 via the print screen controller 511. The print capability display process performed in this step S1003 is the same as the print capability display process in this step S703, and hence description thereof is omitted.

In the step S1004, the printer information management section 515 determines whether or not a print setting-changing request, i.e., a request for changing the print settings has been received. If it is determined in the step S1004 that the print setting-changing request has been received, the process proceeds to a step S1005. On the other hand, if it is determined in the step S1004 that no print setting-changing request has been received, the process proceeds to a step S1006.

In the step S1005, the printer information management section 515 determines the print settings according to the print setting-changing request received in the step S1004.

In the step S1006, the printer information management section 515 determines via the print screen controller 511 whether or not the printing with the print settings determined in the step S1005 has been determined. If it is determined in the step S1006 that the printing has been determined, the process proceeds to a step S1007. On the other hand, if it is determined in the step S1006 that the printing has not been determined, the process returns to the step S1001, and the step S1001 et seq. are sequentially executed.

In the step S1007, the IPP client controller 503 transmits the print data to the printer 101 according to the information obtained from the print screen controller 511 and the information obtained from the printer information management section 515. After that, the process returns to the step S1001, and the step S1001 et seq. are sequentially executed.

As described above, in the present embodiment, even in a case where the printer 101 is used without registering the printer 101, the capability information of the printer 101 is displayed as the icons. With this, it is possible to easily grasp what capabilities each printer 101 has, and therefore, it is possible to quickly select the printer 101 desired to execute printing from the plurality of printers 101.

Figure 13:
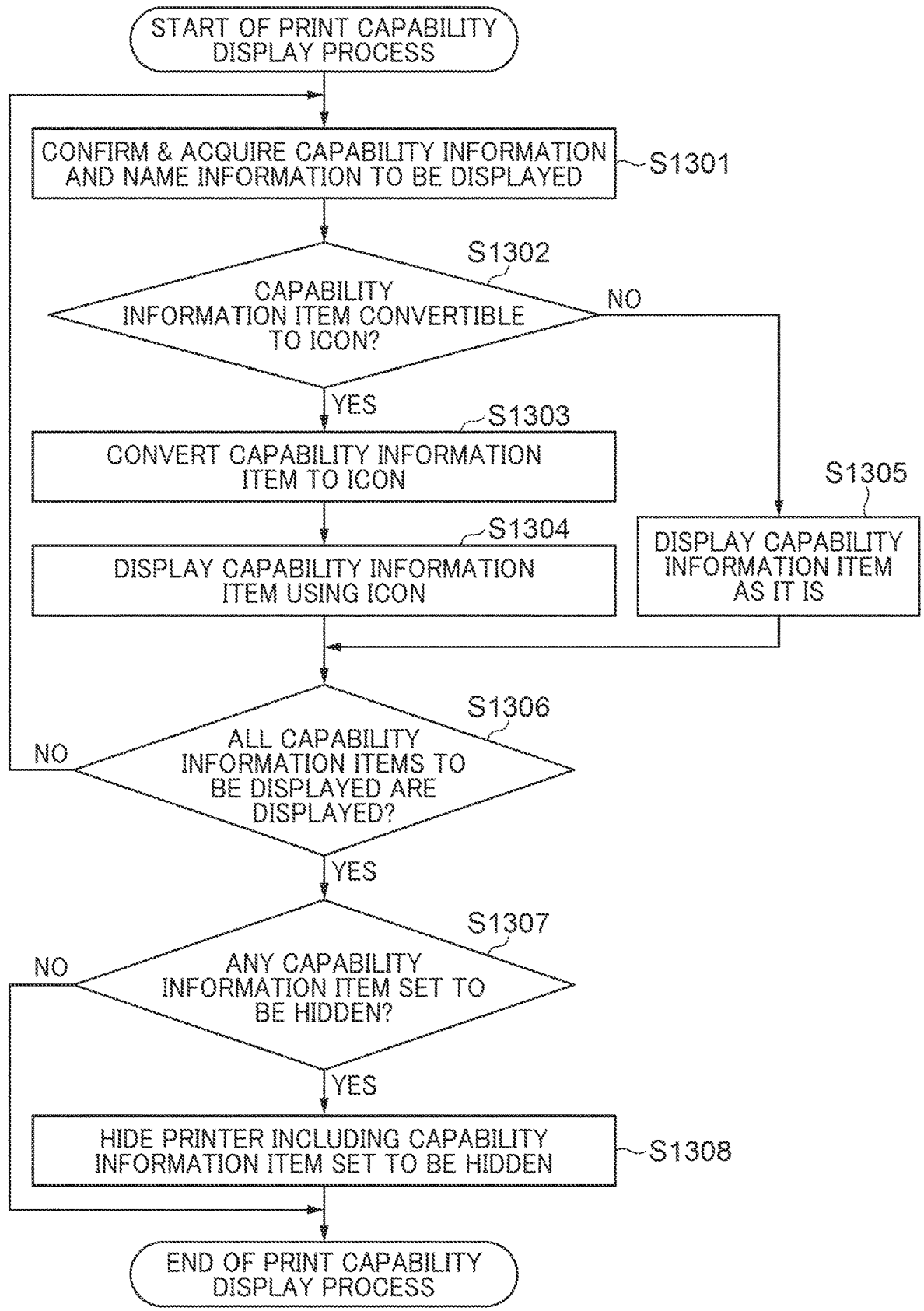
FIG. 13 is a flowchart of a print capability display process according to a third embodiment.
Figure 14A:
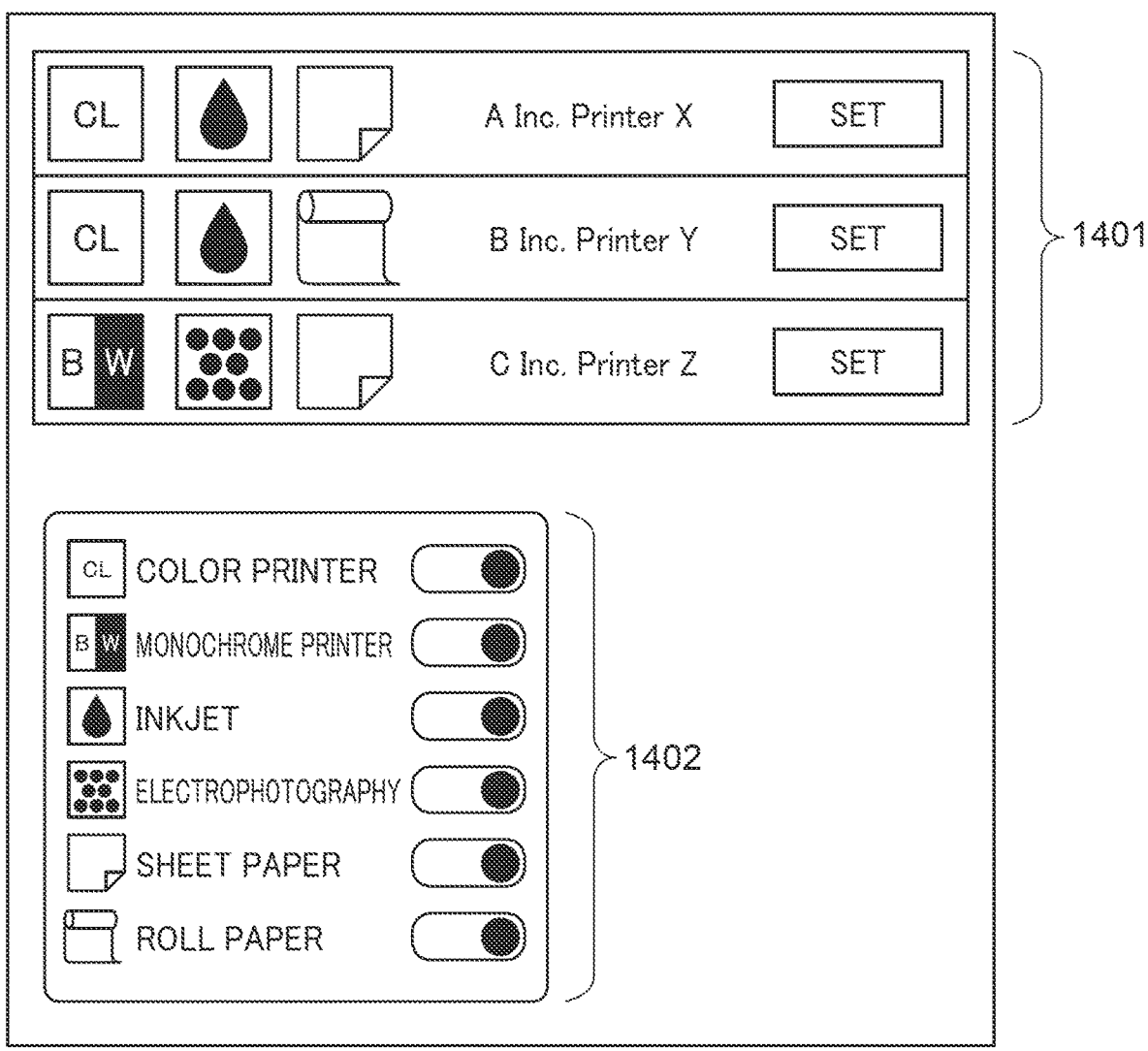
FIGS. 14A and 14B are diagrams each showing an example of the capability information of the printers.
Figure 14B:
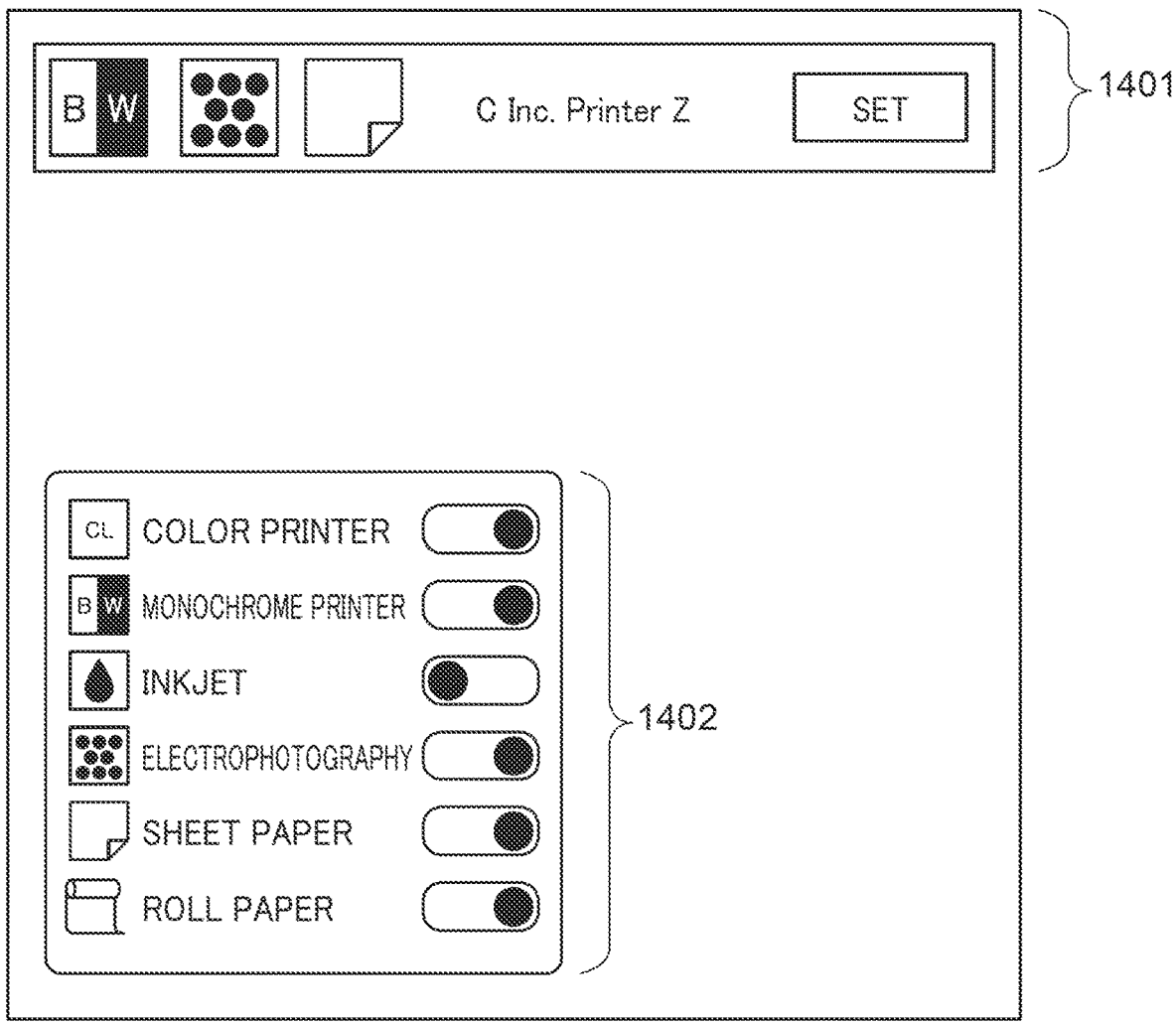

Hereafter, a third embodiment will be described with reference to FIGS. 13, 14A and 14B, but the description is given mainly of different points from the above-described embodiments, and description of the same points is omitted. In the first and second embodiments, the printer(s) 101 as candidate(s) to be registered and the printer(s) 101 as candidate(s) of a printing destination are all displayed on the information processing apparatus 100. In this case, depending on the number of printers 101 displayed on the information processing apparatus 100, it can be difficult to select a desired printer 101 from the plurality of printers 101. To solve this problem, the information processing apparatus 100 of the present embodiment is configured to be capable of preventing such a situation. FIG. 13 is a flowchart of a print capability display process according to the third embodiment. In the capability display process in FIG. 13, steps S1301 to S1306 are the same as the steps S801 to S806 of the print capability display process in FIG. 8, and hence description of the steps S1301 to S1306 is omitted. FIGS. 14A and 14B are diagrams each showing an example of the capability information of the printers. FIG. 14A is a diagram showing a state in which the printer(s) 101 as candidate(s) to be registered and the printer(s) 101 as candidates of a printing destination are all displayed. FIG. 14B is a diagram showing a state in which some of the printers 101 are prevented from being displayed, i.e. hidden compared with FIG. 14A.

Referring to FIG. 13, in a step S1307, the printer information management section 515 determines whether or not there is any capability information item set to be hidden via the print screen controller 511. If it is determined in the step S1307 that there is any capability information item set to be hidden, the process proceeds to a step S1308. On the other hand, if it is determined in the step S1307 that there is no capability information item set to be hidden, the process is terminated.

On the screen shown in FIG. 14A, there are displayed the candidates 1401 of the printer 101 and a setting section 1402 on which an operation for switching display/non-display of each capability information item is performed. The candidates 1401 includes the printers 101 to be registered in the information processing apparatus 100 or the printers 101 to be used for printing. In the state shown in FIG. 14A, the setting section 1402 is in a state in which all of the capability information items can be displayed. In this case, the printer information management section 515 determines that there is no capability information item set to be hidden. Then, the printer information management section 515 displays apparatus information of all of the printers 101 as the candidates (the printers 101X to 101Z), followed by terminating the print capability display process. On the other hand, in the state shown in FIG. 14B, the setting section 1402 is in a state in which the capability information item of the inkjet method is set to be hidden, and the other capability information items can be displayed. In this case, the printer information management section 515 determines that there is a capability information item set to be hidden.

In the step S1308, the printer information management section 515 hides the apparatus information of the printer(s) 101 having its/their capability information items set to be hidden, i.e., in the illustrated or non-illustrated example, the apparatus information of the printer 101X and the printer 101Y. As a result, as shown in FIG. 14B, only the electrophotographic printer 101, i.e. the printer 101Z is displayed as the candidate 1401. After execution of the step S1308, the process is terminated.

As described above, in the present embodiment, the setting section 1402 functions as operation means for performing the operation of inhibiting the display of the capability information item(s) (icon(s)). Further, in a case where the display inhibition operation in the setting section 1402 is performed, the display of the icon(s) which is/are the target(s) of this operation and the name information item(s) of the printer(s) 101 having its/their capability information item(s) to be converted to the icon(s) is inhibited. With this, even when the plurality of printers 101 exist as the candidates, it is possible to narrow the candidates, and therefore, it is possible to easily select a desired printer 101. Note that although in the present embodiment, the setting section 1402 is displayed on the screen, this is not limitative, but for example, the setting section 1402 can be formed by a mechanical button. Further, in place of the setting section 1402, display/non-display of each capability information item can be switched by the OFF/ON operation on an associated icon.

Figure 15:
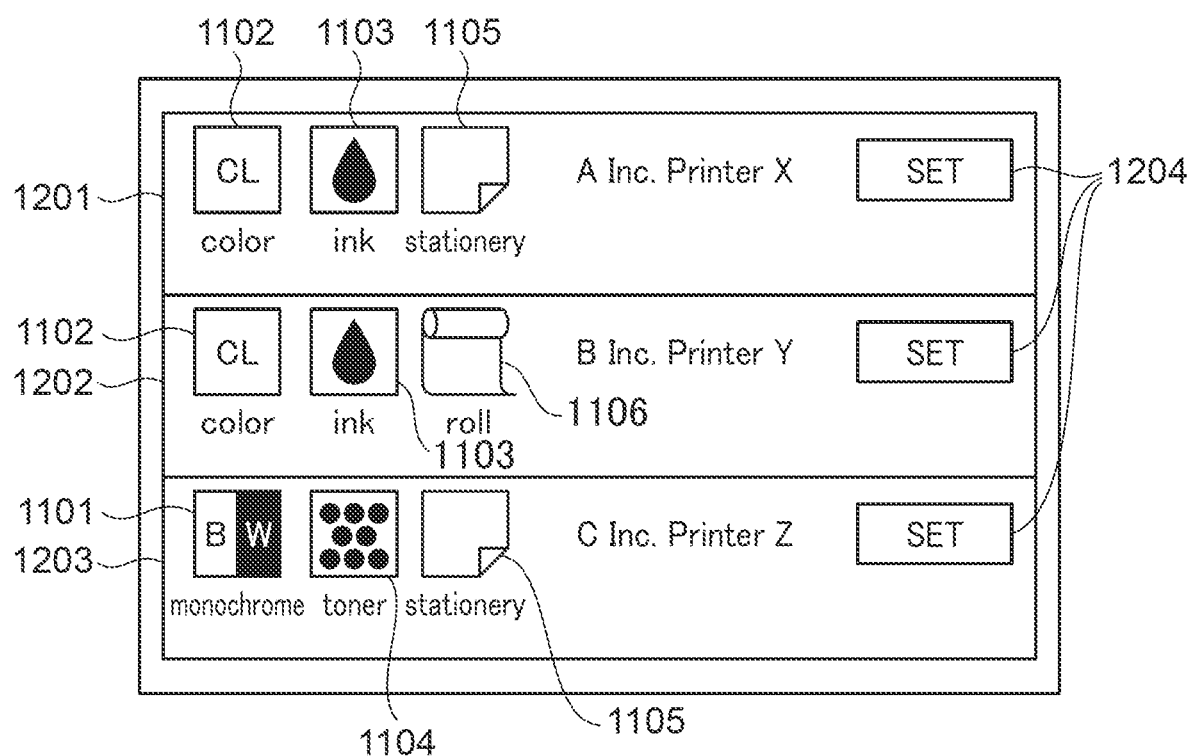
FIG. 15 is a diagram showing an example of the capability information of the printers according to a fourth embodiment.

Hereafter, a fourth embodiment will be described with reference to FIG. 15, but the description is given mainly of different points from the above-described embodiments, and description of the same points is omitted. FIG. 15 is a diagram showing an example of the capability information of the printers, according to the fourth embodiment. As shown in FIG. 15, on the printer information display section 516, in a position adjacent to (under) the monochrome printer icon 1101, the character string "monochrome" describing the capability information of this icon is displayed. Further, in a position adjacent to (under) the color printer icon 1102, the character string "color" describing the capability information of this icon is displayed. In a position adjacent to (under) the inkjet method icon 1103, the character string "ink" describing the capability information of this icon is displayed. In a position adjacent to (under) the electrophotographic method icon 1104, the character string "toner" describing the capability information of this icon is displayed. In a position adjacent to (under) the sheet paper icon 1105, the character string "stationery" describing the capability information of this icon is displayed. In a position adjacent to (under) the roll paper icon 1106, the character string "roll" describing the capability information of this icon is displayed. With this, it is possible to accurately grasp what is represented by each icon, and therefore, it is possible to improve the convenience when selecting the printer 101.

The present invention has been described heretofore based on the embodiments thereof. However, the present invention is not limited to these embodiments, but it is to be understood that the invention includes a variety of forms within the scope of the gist of the present invention. Further, it is possible to combine two or more configurations (features) of the embodiments on an as-needed basis. For example, a character string describing capability information, examples of which are illustrated in FIG. 15, can be included in the display form shown in FIG. 14. The present invention may also be accomplished by supplying a system or an apparatus with a program which realizes one or more functions of the above-described embodiments via a network or a storage medium, and causing one or more processors of a computer of the system or apparatus to read out and execute the program. Further, the present invention can also be accomplished by a circuit which realizes one or more functions. This circuit is not particularly limited, but for example, an ASIC or FPGA can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-000719 filed Jan. 5, 2023, which is hereby incorporated by reference herein in its entirety.

What is claimed is:

1. A non-transitory computer-readable storage medium storing a program executable by a computer of an information processing apparatus to execute a method of supporting general-purpose software that generates print data printable by a plurality of printers of a plurality of makers, the method comprising:
   causing the information processing apparatus to receive, from a target printer included in the plurality of printers, capability information indicating a plurality of capabilities, including a print color mode, a marker type, and a media type, of the target printer included in the printers of the plurality of makers;
   causing the information processing apparatus to determine whether or not each of the capabilities indicated by the received capability information is convertible to a respective icon;
   causing the information processing apparatus to generate the respective icon reflecting each of the capabilities indicated by the received capability information determined to be convertible; and
   causing the information processing apparatus to display identification information of the target printer and the generated icons respectively representing the plurality of capabilities indicated by the received capability information, the displayed icon representing the print color mode reflecting monochrome or color, the displayed icon representing the marker type reflecting ink or toner, and the displayed icon representing the media type reflecting stationary or roll.

2. The non-transitory computer-readable storage medium according to claim 1, wherein:
   the method further comprises causing the information processing apparatus to receive the identification information of the target printer, and
   the received identification information of the target printer and the generated icons are displayed.

3. The non-transitory computer-readable storage medium according to claim 1, wherein the method further comprises causing the information processing apparatus to inhibit, in a state where an operation for inhibiting display of an icon is performed, display of the icon as a target of the inhibiting operation and the identification information of the printer having an item of the capability information corresponding to the icon.

4. The non-transitory computer-readable storage medium according to claim 1, wherein character strings describing the icons are displayed.

5. The non-transitory computer-readable storage medium according to claim 1, wherein:
   the method further comprises causing the information processing apparatus to register the target printer, and
   the generated icons are displayed before registering the target printer.

6. The non-transitory computer-readable storage medium according to claim 1, wherein:
   the method further comprises causing the information processing apparatus to instruct the target printer to perform printing, and
   the generated icons are displayed before instructing the target printer to perform printing.

7. The non-transitory computer-readable storage medium according to claim 1, wherein as the capability information, information associated with printing executable by the target printer is received.

8. The non-transitory computer-readable storage medium according to claim 1, wherein:
   the capability information of each of the printers of the plurality of makers is received, and
   the identification information of each of the printers and the generated icons respectively representing the plurality of capabilities of each of the printers are displayed.

9. The non-transitory computer-readable storage medium according to claim 1, wherein the general-purpose software is software using IPP.

10. The non-transitory computer-readable storage medium according to claim 1, wherein the identification information of the target printer is a name of the target printer.

11. The non-transitory computer-readable storage medium according to claim 1, wherein the information processing apparatus is caused to receive, according to IPP, the capability information indicating the plurality of capabilities of the target printer included in the printers of the plurality of makers.

12. The non-transitory computer-readable storage medium according to claim 11, wherein the method further comprises:
   causing the information processing apparatus to transmit Get-printer-attributes command of IPP to the target printer,
   wherein the information processing apparatus is caused to receive, according to a Get-printer-attributes command of IPP, the capability information indicating the plurality of capabilities of the target printer included in the printers of the plurality of makers.

13. The non-transitory computer-readable storage medium according to claim 1, wherein the information processing apparatus is caused to receive, from the target printer, the capability information indicating the plurality of capabilities of the target printer included in the printers of the plurality of makers.

14. The non-transitory computer-readable storage medium according to claim 1, wherein the received capability information is used to generate the icons based on a table showing a relationship between the plurality of capabilities and icons.

15. A control method for an information processing apparatus that executes a program to support general-purpose software that generates print data printable by a plurality of printers of a plurality of makers, the control method comprising:
- causing the information processing apparatus to receive, from a target printer included in the plurality of printers, capability information indicating a plurality of capabilities, including a print color mode, a marker type, and a media type, of the target printer included in the printers of the plurality of makers;
- causing the information processing apparatus to determine whether or not each of the capabilities indicated by the received capability information is convertible to a respective icon;
- causing the information processing apparatus to generate the respective icon reflecting each of the capabilities indicated by the received capability information determined to be convertible; and
- causing the information processing apparatus to display identification information of the target printer and the generated icons respectively representing the plurality of capabilities indicated by the received capability information, the displayed icon representing the print color mode reflecting monochrome or color, the displayed icon representing the marker type reflecting ink or toner, and the displayed icon representing the media type reflecting stationary or roll.

16. An information processing apparatus comprising:
- a memory that stores a program supporting a general-purpose software that generates print data printable by a plurality of printers of a plurality of makers;
- a processor that executes the program to:
  - receive, from a target printer included in the plurality of printers, capability information indicating a plurality of capabilities, including a print color mode, a marker type, and a media type, of the target printer included in the printers of the plurality of makers;
  - determine whether or not each of the capabilities indicated by the received capability information is convertible to a respective icon;
  - generate the respective icon reflecting each of the capabilities indicated by the received capability information determined to be convertible; and
  - display identification information of the target printer and the generated icons respectively representing the plurality of capabilities indicated by the received capability information, the displayed icon representing the print color mode reflecting monochrome or color, the displayed icon representing the marker type reflecting ink or toner, and the displayed icon representing the media type reflecting stationary or roll.

* * * * *